US009799079B2

(12) United States Patent
Chetuparambil et al.

(10) Patent No.: US 9,799,079 B2
(45) Date of Patent: Oct. 24, 2017

(54) GENERATING A MULTI-DIMENSIONAL SOCIAL NETWORK IDENTIFIER

(71) Applicant: International Business Machines Corporation, Armonk, NY (US)

(72) Inventors: Madhu Chetuparambil, San Jose, CA (US); Kalapriya Kannan, Bangalore (IN); George T. Jacob, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 14/040,937

(22) Filed: Sep. 30, 2013

(65) Prior Publication Data
US 2015/0095417 A1 Apr. 2, 2015

(51) Int. Cl.
G06Q 50/00 (2012.01)
G06Q 30/02 (2012.01)
G06Q 10/10 (2012.01)

(52) U.S. Cl.
CPC .......... *G06Q 50/01* (2013.01); *G06Q 10/101* (2013.01); *G06Q 30/0282* (2013.01)

(58) Field of Classification Search
CPC .. G06C 50/01; G06C 10/101; G06C 30/0282; H04L 43/0876
See application file for complete search history.

(56) References Cited

U.S. PATENT DOCUMENTS 8,108,406 B2 1/2012 Kenedy et al.
8,386,519 B2 2/2013 Kenedy et al.
2009/0327181 A1 12/2009 Lee et al.
2012/0323663 A1* 12/2012 Leach ................ G06Q 30/0239 705/14.25
2014/0101243 A1* 4/2014 Naveh .................... G06Q 50/01 709/204
2014/0289261 A1* 9/2014 Shivakumar ......... G06Q 10/101 707/748

FOREIGN PATENT DOCUMENTS

WO 2007101278 A2 9/2007

OTHER PUBLICATIONS dictionary.com for definition of "metric".*
(Continued)

*Primary Examiner* — Krista Zele
*Assistant Examiner* — Brandon L Sykes
(74) *Attorney, Agent, or Firm* — Ryan, Mason & Lewis, LLP

(57) ABSTRACT

Methods, systems, and articles of manufacture for generating a multi-dimensional social network identifier are provided herein. A method includes capturing one or more items of web information pertaining to past activity associated with a given individual; determining one or more user metrics associated with the given individual based on the one or more items of web information; quantifying a measure of similarity of the one or more user metrics associated with the given individual and the one or more user metrics associated with one or more additional individuals; and generating an identifier for the given individual based on the measure of similarity, and wherein said identifier differs from identification information attributable to the given individual on a social network.

24 Claims, 4 Drawing Sheets

(56) References Cited

OTHER PUBLICATIONS

Sirivianos et al. Assessing the Veracity of Identity Assertions via OSNs, COMSNET 2012.
Baden et al. Identifying Close Friends on the Internet, ACM SIGCOMM, (2009).
Danezis et al. Sybillnfer: Detecting Sybil nodes Using Social Networks, Microsoft, Jan. 2009.
Sydow, Towards Context-Enriched Trust Prediction: A Proposal. CEUR Workshop Proceedings, vol. 371, pp. 11-16, 2008.
Nandi et al. P3: A Privacy Preserving Personalization Middleware for Recommendation-Based Services, in Proceedings of 4th Hot Topics in Privacy Enhancing Technologies Symposium (HotPETS 2011) held in conjunction with PETS 2011, Waterloo, Canada.
Lumbreras et al. Applying Trust Metrics Based on User Interactions to Recommendation in Social Networks, 2012 International Conference on Advances in Social Networks Analysis and Mining (ASONAM 2012).
Guha et al. Propagation of Trust and Distrust, WWW2004.
Zolfaghar et al. Mining Trust and Distrust Relationships in Social Web Applications, ICCP, 2010.
Matsuo et al. Finding Social Network for Trust Canculation, in proc. ECAI 2004.
Cleland-Huang, Using Data Mining and Recommender Systems to Scale up the Requirements Process, ULSSIS 2009.
Cho et al. A Personalized Recommender System Based on Web Usage Mining and Decision Tree Induction, Expert Systems with Application, 2002.
Wiebe, Learning Subjective Adjectives from Corpora, in AAAI 2000.
Bruce et al. Recognizing Subjectivity: A Case Study of Manual Tagging, Natural Language Engineering (1999).
Lu et al. Exploring the Sentiment Strength of User Reviews, Proceedings of the 11th International Conference on Web-age Information Management, Jul. 15-17, 2010.

* cited by examiner

GENERATING A MULTI-DIMENSIONAL SOCIAL NETWORK IDENTIFIER

FIELD OF THE INVENTION

Embodiments of the invention generally relate to information technology, and, more particularly, to social network-related technology.

BACKGROUND

Social network data such as data derived from blogs, reviews, message boards, etc., typically include anonymous entries that are based on the subjective opinion of the author and/or consumer. Additionally, such data presented can be contradictory and it may be left to the user to derive meaningful conclusions therefrom. Accordingly, subjectivity can be an important and challenging factor for recommendation systems.

Existing recommendation systems and approaches commonly utilize metrics that rely on analysis of social network data, overlooking the problem of anonymity, and merely provide quantitative measures that summarize opinions presented within the social network data.

Consequently, a need exists for a metric to elicit an importance level of a given item of content with respect to an individual while masking the actual identity of the content owner.

SUMMARY

In one aspect of the present invention, techniques for generating a multi-dimensional social network identifier are provided. An exemplary computer-implemented method can include steps of capturing one or more items of web information pertaining to past activity associated with a given individual; determining one or more user metrics associated with the given individual based on the one or more items of web information; quantifying a measure of similarity of the one or more user metrics associated with the given individual and the one or more user metrics associated with one or more additional individuals; and generating an identifier for the given individual based on the measure of similarity, wherein said identifier differs from identification information attributable to the given individual on a social network.

In another aspect of the invention, an exemplary computer-implemented method can include steps of determining one or more user preferences associated with a given individual based on web information pertaining to commerce-related activity associated with the given individual; generating an identifier for the given individual based on the one or more user preferences, wherein said identifier differs from identification information attributable to the given individual on a social network; quantifying a measure of similarity between the one or more user preferences associated with the identifier and the one or more user preferences associated with one or more additional identifiers on the web; and applying the similarity measure associated with the identifier for the given user to a web-based search associated with the given user to prioritize a search result derived from an identifier with a higher similarity measure as compared to a search result derived from an identifier with a lower similarity measure.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
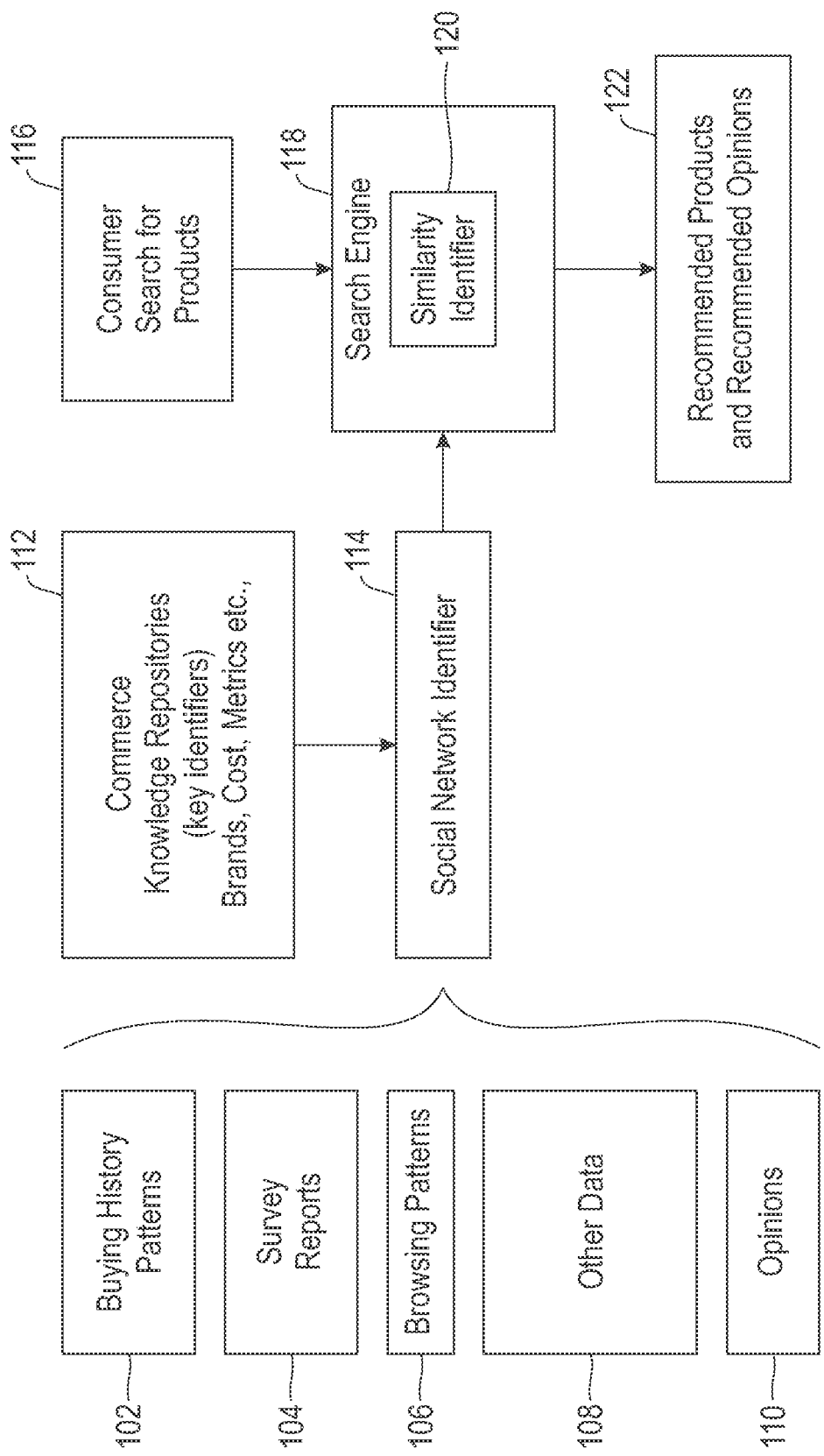
FIG. 1 is a diagram illustrating an example embodiment, according to an aspect of the invention.

As described herein, an aspect of the present invention includes techniques for deriving a multi-dimensional social network identifier that preserves privacy and trust. An example of such an identifier includes a weighted score based on different dimensions such as brand consciousness (which, in turn, is a numeric value derived by searching information pertaining to buying patterns and co-relating the patterns to a number), preference of cost, etc. Each of these dimensions can be derived from searching various items of information pertaining to the individuals, including social network profile and/or user generated content. While information shared on social networks is often personal, and while users and/or consumers commonly do not like having such information used unnecessarily or used for commercial reviews, similarity of opinion among individuals, if captured, can be utilized to increase the trust value of content, opinions and/or recommendations for consumers.

Accordingly, at least one embodiment of the invention includes generating a privacy-preserving social network identity for an individual that captures a similarity level among other individuals. This identity can be used, for example, to further derive trust metrics without exposing personal and/or individual characteristics of consumers. For example, such a trust-based similarity identity can be used to rank the contents of a particular entry for consumers, to increase the trust associated with such contents, to filter contents that should be utilized for marketing and/or recommendations, etc. Additionally, at least one embodiment of the invention can include implementation in the context of customer segmentation, wherein criteria for such customer segmentation is not based on user profile information (age, demographics, registration details, etc.) but through a similarity identifier.

As such, at least one embodiment of the invention includes implementing web searching techniques to provide an identity for a consumer while masking his or her actual social network profile(s). Such an embodiment includes identifying sources of information wherein a similarity level across consumers can be captured. Such information can include, for example, social network profiles (such as from Facebook®, Twitter®, etc.), buying behavior and patterns, opinions and/or comments input on message boards, commercial vendor sites, product or services sites, etc., searching and/or browsing history, web usage patterns, consumer survey output, etc. Such information sources can be identified, for example, through human assistance and/or a social network expert who understands the availability of social network profiles and information derivable through such profiles. Various analytics can additionally be used to derive one or more features of an individual available from these data sources.

Additionally, at least one embodiment of the invention includes identifying one or more metrics relevant to consumer value based on parameters such as, for example, search inputs and/or standard terms in commerce (such as brand, cost, high value etc.). Additional metrics that can be used include, for example, buying patterns and behavior patterns of consumers on electronic commerce (e-commerce) websites, trust metrics derivable via interactions on social networks, responses generated through social interactions such as blogging, etc. For instance, the trust parameter for an individual on a social network can be computed as follows:

Trust=function (comments, responses)+function (blogs, responses)+function (products purchased, comments posted).

A similarity measure can be quantified by combining the identified metrics, for example, via a vector of weights along multiple dimensions. Given below is an algorithm utilized to detect similarity between two people (considered as records) in accordance with one or more embodiments of the invention.

Dataset: Assume a dataset containing records with fields $f_1, f_2, \ldots f_n$ (wherein values may be missing). Examples of fields include brand consciousness, cost consciousness, social network profile similarity score, etc.

Aim: To recognize any similar records given a set of records, for example, $r_1, r_2 \ldots r_m$.

Algorithm:
Assign weights $w_1, w_2 \ldots w_n$ between 0 and 1 to each of the fields.
Assign a similarity measure $s_i$ (j, k) for each field ($f_n$) given two records ($r_j, r_k$)
The final similarity measure will be S (j, k)=$\Sigma w_i s_i$(j,k).
By determining a threshold t such that if S (j, k)>t, it can be concluded that data records $r_j$ and $r_k$ are similar.

As noted, at least one embodiment of the invention also includes deriving an identity for the given consumer, and subsequently utilizing the identity for providing recommendations to social network content.

FIG. 1 is a diagram illustrating an example embodiment, according to an aspect of the invention. As depicted in FIG. 1, a variety of sources of information can be utilized for deriving a social network identifier 114. Such information can include buying history patterns 102, survey reports 104, web browsing patterns 106, previously submitted opinions 110 and other data 108. The social network identifier 114 captures such consumer preference and/or subjectivity towards certain commerce-specific aspects, such as, for instance, brand consciousness, cost consciousness, etc. Commerce-specific aspects related to the user or consumer in question can be obtained from knowledge repositories 112.

Additionally, when a consumer conducts a search 116 for specific products via search engine 118, the social network identifier 114 is used to match the searching consumer with other consumers who have similar social network identifiers (via sub-component 120) to ultimately fetch recommended products and opinions 122 associated with those other consumers.

Social network identifier 114 includes an algorithm that searches various sources of information, as noted above, for commerce-related aspects pertaining to given consumers. For each such commerce-related aspect, different sources of information are searched to determine the preferences of each given consumer towards the aspect. Additionally, the social network identifier 114 includes a vector of weights along these aspect dimensions. The derived social commerce network identifier can take into account all commerce-related transactions and, thus, the bias of a particular consumer towards a commerce-related activity can be obtained. Accordingly, a similarity measure for this given consumer with respect to other consumers can be generated based on the identified preferences and/or biasness.

As noted above, recommendations 122 can be generated based on the social network identifier 114. Such recommendations can include, for example, opinions and/or products based on the similarity of the social commerce network identifier of the searching consumer with the social commerce network identifiers of other users and/or consumers. The recommendations 122 can be further used for opinion searching, etc.

As also detailed herein, in at least one embodiment of the invention, a social network identifier for a given consumer masks and/or protects personal information (such as social network profile information) of the consumer. Accordingly, at least one embodiment of the invention includes an algorithm for obtaining a privacy-preserving identity that creates an ordered list of data and criteria, wherein such data represent the collection of the web documents, and wherein the criteria is a list of those documents on which the privacy preserving action is carried out. By way of example, the data can include web comments, message board comments, individual profiles, connection networks, references, blogs, feedback pages, sentiment values, etc. Similarly, a criteria list might include, for example, features on which sentiments were expressed (that is, identifying which features are of interest to individuals), brands, costs, specific features of a product, relevant expressions of opinion from existing web history, etc.

Accordingly, an algorithm such as noted above can include extracting sentiments expressed by each given individual person or user, categorizing the sentiments based on the features in the criteria list, and providing a quantitative ranking of the sentiments within each established category. The quantitative ranking of the sentiments for each of the established category can be carried out, for example, as follows. For each product, at least one embodiment of the invention includes identifying the commerce features important for consumers by obtaining the features from the commerce website and by searching through social data to determine various items and/or levels of importance. Searching social data can yield a frequency count of one or more variables from which an importance value can be derived.

For each feature list derived, at least one embodiment of the invention includes determining the number of positive sentiments and negative sentiments expressed by users. Based on the bias observed in the number of positive and negative sentiments, weights can be assigned to individual users who have provided a positive and/or negative sentiment towards one or more features. A weighted sum of the scores derived across all features for a specific consumer can provide an identity score.

At least one embodiment of the invention also includes incorporating considerations of user subjectivity by utilizing the quantitative ranking of individual features by individuals to compare for similarity. Such a comparison can be carried out across one or multiple dimensions. This includes both comparison of different sentiments generated by the same consumer and comparison of related sentiments made by different consumers. The output of such an algorithm can include, for each criteria item, a ranking of each considered individual, wherein a vector of weights is derived and used to rank the individuals. By way of example, assume that an individual profile shows that the person is brand and cost conscious. Thus, the weights that are assigned for these two parameters while searching for an equivalent profile are increased. The vector is a representation with respect to different dimensions.

Figure 2:
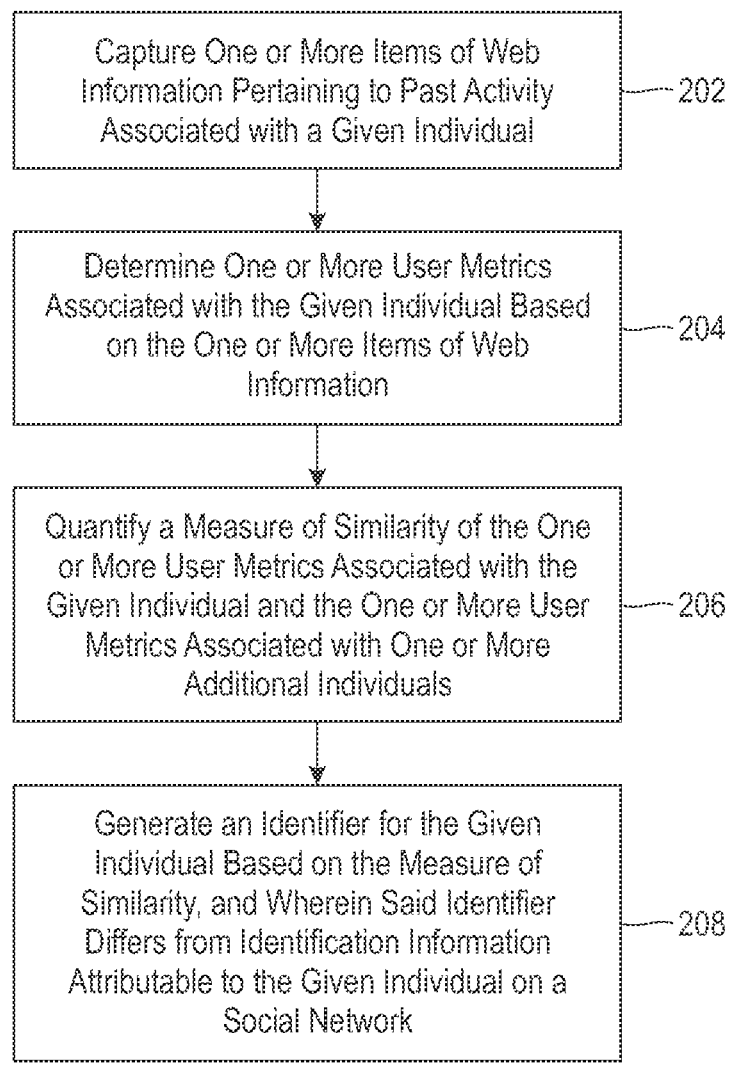
FIG. 2 is a flow diagram illustrating techniques according to an embodiment of the invention.

FIG. 2 is a flow diagram illustrating techniques according to an embodiment of the invention. Step 202 includes capturing one or more items of web information pertaining to past activity associated with a given individual. Items of web information pertaining to past activity associated with the given individual can include commerce activities associated with the given individual such as purchasing behavior associated with the given individual, one or more web-based comments pertaining to a commercial product and/or service attributable to the given individual, and/or a survey output pertaining to a commercial product and/or service attributable with the given individual.

Additionally, items of web information pertaining to past activity associated with the given individual can include social network activities associated with the given individual such as social network activities related to commerce and/or past purchases associated with the given individual. Further, items of web information pertaining to past activity associated with the given individual can include social network information associated with the given individual such as a social network profile associated with the given individual. Also, items of web information pertaining to past activity associated with the given individual can include one or more web usage patterns associated with the given individual.

Step 204 includes determining one or more user metrics associated with the given individual based on the one or more items of web information. The metrics can include, for example, a metric pertaining to commercial brand preference, a metric pertaining to product and/or service cost preference, and/or a metric pertaining to product and/or service quality preference. The determining step can also include determining one or more metrics associated with a given level of trust so as to preserve a level of privacy in connection with the identity of the given individual.

Step 206 includes quantifying a measure of similarity of the one or more user metrics associated with the given individual and the one or more user metrics associated with one or more additional individuals. Quantifying the measure of similarity can include combining the one or more user metrics associated with the given individual and comparing the combined user metrics associated with the same combined user metrics associated with one or more additional individuals.

Step 208 includes generating an identifier for the given individual based on the measure of similarity, wherein said identifier differs from identification information attributable to the given individual on a social network.

Figure 3:
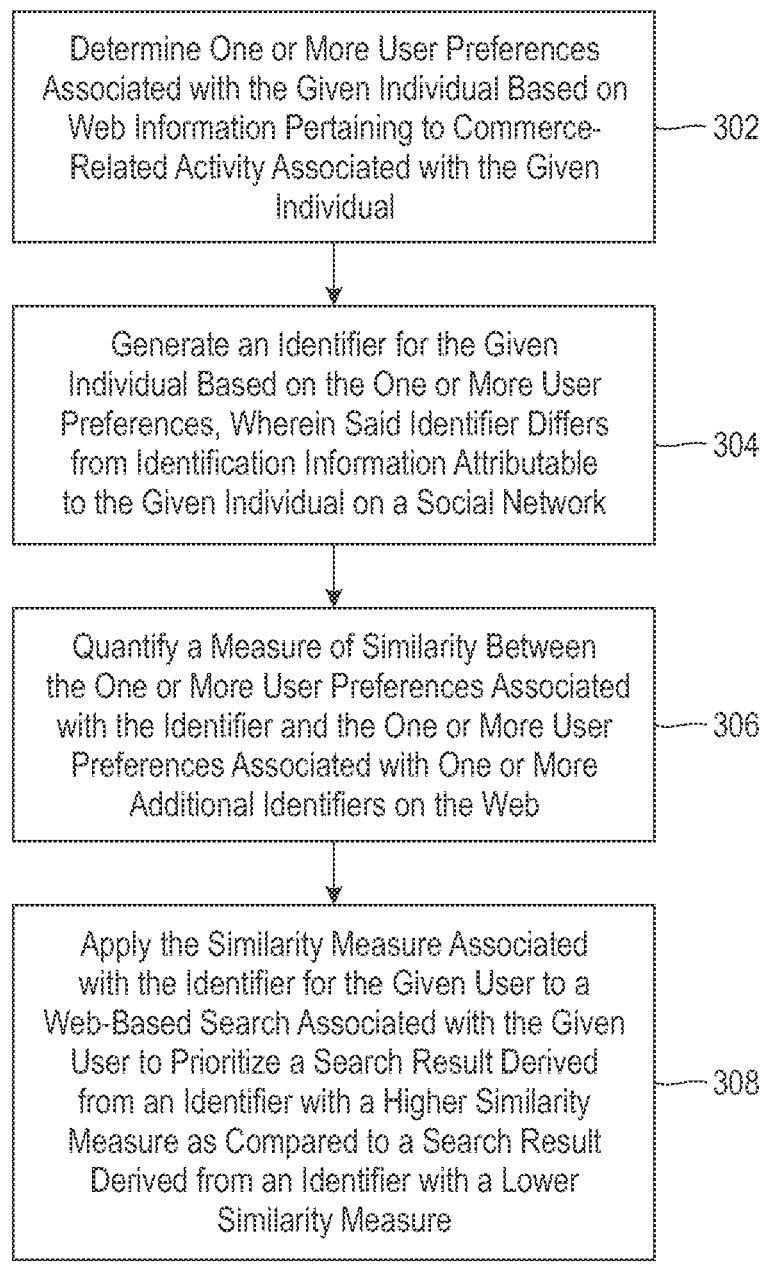
FIG. 3 is a flow diagram illustrating techniques according to an embodiment of the invention.

FIG. 3 is a flow diagram illustrating techniques according to an embodiment of the invention. Step 302 includes determining one or more user preferences associated with a given individual based on web information pertaining to commerce-related activity associated with the given individual. Commerce-related activity associated with the given individual can include one or more web-based comments pertaining to a commercial product and/or service attributable to the given individual.

The determining step can also include determining one or more user preferences associated with a given level of trust so as to preserve a level of privacy in connection with the identity of the given individual.

Step 304 includes generating an identifier for the given individual based on the one or more user preferences, wherein said identifier differs from identification information attributable to the given individual on a social network. Step 306 includes quantifying a measure of similarity between the one or more user preferences associated with the identifier and the one or more user preferences associated with one or more additional identifiers on the web.

Step 308 includes applying the similarity measure associated with the identifier for the given user to a web-based search associated with the given user to prioritize a search result derived from an identifier with a higher similarity measure as compared to a search result derived from an identifier with a lower similarity measure.

The techniques depicted in FIG. 3 can additionally include ranking a set of results for the web-based search according to relative similarity measure, as well as generating a recommendation of an item of content based on the similarity measure.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 4:
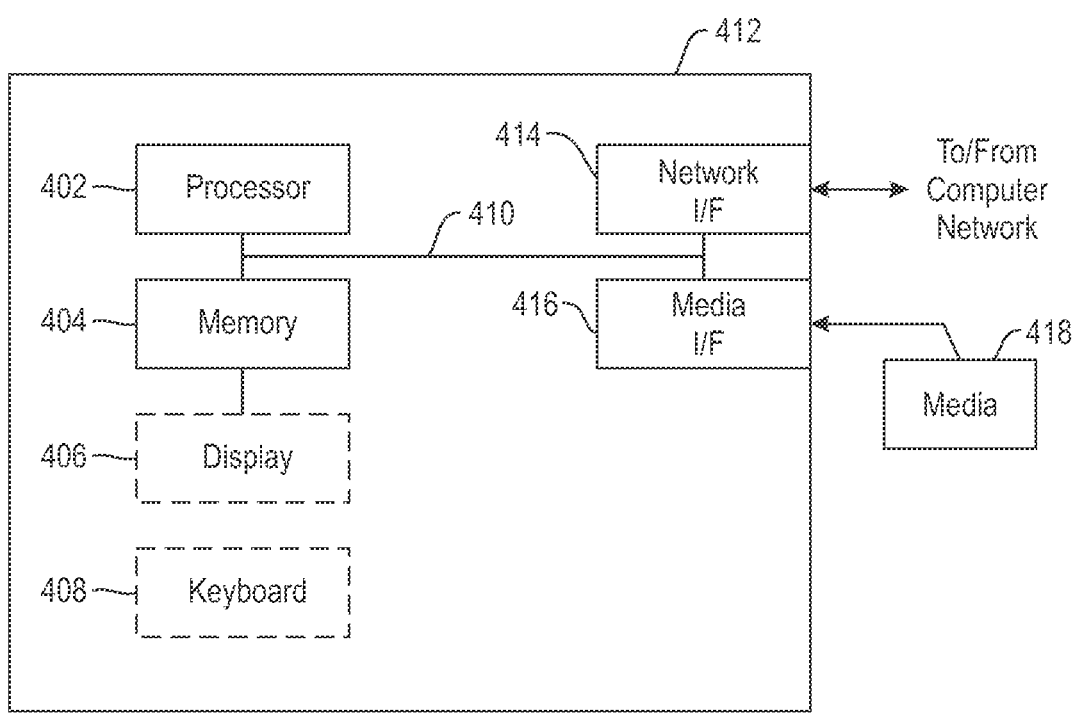
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing a social network identity for a consumer while masking his or her actual social network profile.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:
1. A method comprising:
capturing one or more items of web information pertaining to past activity associated with a given individual;
determining multiple user metrics associated with the given individual based on the one or more items of web information;
quantifying a measure of similarity of the multiple user metrics associated with the given individual and the multiple user metrics associated with one or more additional individuals, wherein the measure of similarity comprises a weighted score combining the multiple user metrics, wherein each of the multiple user metrics are assigned a distinct weight based on (i) a number of positive sentiments expressed by the individual in connection with each of the multiple user metrics and

(ii) a number of negative sentiments expressed by the individual in connection with each of the multiple user metrics;

generating an identifier that identifies the given individual, wherein the identifier is based on the measure of similarity, and wherein said identifier differs from and is used in lieu of identification information attributable to the given individual on a social network during one or more web searching activities; and generating one or more recommendations for a separate individual in response to a web search conducted by the separate individual for one or more items related to the captured items of web information associated with the given individual, wherein the one or more recommendations are based on a level of similarity between (i) the generated identifier that identifies the given individual and (ii) a generated identifier that identifies the separate individual, and wherein the one or more recommendations comprise (a) identification of one or more items related to the web search and indicated as recommended by the generated identifier, and (b) one or more opinions pertaining to one or more items related to the web search and indicated as authored by the generated identifier;

wherein the steps are carried out by at least one computing device.

2. The method of claim 1, wherein said determining comprises determining one or more metrics associated with a given level of trust so as to preserve a level of privacy in connection with the identity of the given individual.

3. The method of claim 1, wherein said one or more items of web information pertaining to past activity associated with the given individual comprise commerce activities associated with the given individual.

4. The method of claim 3, wherein said commerce activities associated with the given individual comprise purchasing behavior associated with the given individual.

5. The method of claim 3, wherein said commerce activities associated with the given individual comprise one or more web-based comments pertaining to a commercial product and/or service attributable to the given individual.

6. The method of claim 3, wherein said commerce activities associated with the given individual comprise a survey output pertaining to a commercial product and/or service attributable with the given individual.

7. The method of claim 1, wherein said one or more items of web information pertaining to past activity associated with the given individual comprise social network activities associated with the given individual.

8. The method of claim 7, wherein said social network activities comprise one or more social network activities related to commerce and/or one or more past purchases associated with the given individual.

9. The method of claim 1, wherein said one or more items of web information pertaining to past activity associated with the given individual comprises a social network profile associated with the given individual.

10. The method of claim 1, wherein said one or more items of web information pertaining to past activity associated with the given individual comprise one or more web usage patterns associated with the given individual.

11. The method of claim 1, wherein said multiple user metrics comprise at least a metric pertaining to commercial brand preference.

12. The method of claim 1, wherein said multiple user metrics comprise at least a metric pertaining to product and/or service cost preference.

13. The method of claim 1, wherein said multiple user metrics comprise at least a metric pertaining to product and/or service quality preference.

14. The method of claim 1, wherein said quantifying the measure of similarity comprises combining the multiple user metrics associated with the given individual and comparing the combined user metrics associated with the same combined user metrics associated with one or more additional individuals.

15. An article of manufacture comprising a non-transitory computer readable storage medium having computer readable instructions tangibly embodied thereon which, when implemented, cause a computer to carry out a plurality of method steps comprising:

capturing one or more items of web information pertaining to past activity associated with a given individual;

determining multiple user metrics associated with the given individual based on the one or more items of web information;

quantifying a measure of similarity of the multiple user metrics associated with the given individual and the multiple user metrics associated with one or more additional individuals, wherein the measure of similarity comprises a weighted score combining the multiple user metrics, wherein each of the multiple user metrics are assigned a distinct weight based on (i) a number of positive sentiments expressed by the individual in connection with each of the multiple user metrics and (ii) a number of negative sentiments expressed by the individual in connection with each of the multiple user metrics;

generating an identifier that identifies the given individual, wherein the identifier is based on the measure of similarity, and wherein said identifier differs from and is used in lieu of identification information attributable to the given individual on a social network during one or more web searching activities; and generating one or more recommendations for a separate individual in response to a web search conducted by the separate individual for one or more items related to the captured items of web information associated with the given individual, wherein the one or more recommendations are based on a level of similarity between (i) the generated identifier that identifies the given individual and (ii) a generated identifier that identifies the separate individual, and wherein the one or more recommendations comprise (a) identification of one or more items related to the web search and indicated as recommended by the generated identifier, and (b) one or more opinions pertaining to one or more items related to the web search and indicated as authored by the generated identifier.

16. The article of manufacture of claim 15, wherein said multiple user metrics comprise at least a metric pertaining to commercial brand preference.

17. The article of manufacture of claim 15, wherein said multiple user metrics comprise at least a metric pertaining to product and/or service cost preference.

18. The article of manufacture of claim 15, wherein multiple user metrics comprise at least a metric pertaining to product and/or service quality preference.

19. A system comprising:

a memory; and at least one processor coupled to the memory and configured for:

capturing one or more items of web information pertaining to past activity associated with a given individual;

determining multiple user metrics associated with the given individual based on the one or more items of web information;

quantifying a measure of similarity of the multiple user metrics associated with the given individual and the multiple user metrics associated with one or more additional individuals, wherein the measure of similarity comprises a weighted score combining the multiple user metrics, wherein each of the multiple user metrics are assigned a distinct weight based on (i) a number of positive sentiments expressed by the individual in connection with each of the multiple user metrics and (ii) a number of negative sentiments expressed by the individual in connection with each of the multiple user metrics;

generating an identifier that identifies the given individual, wherein the identifier is based on the measure of similarity, and wherein said identifier differs from and is used in lieu of identification information attributable to the given individual on a social network during one or more web searching activities; and generating one or more recommendations for a separate individual in response to a web search conducted by the separate individual for one or more items related to the captured items of web information associated with the given individual, wherein the one or more recommendations are based on a level of similarity between (i) the generated identifier that identifies the given individual and (ii) a generated identifier that identifies the separate individual, and wherein the one or more recommendations comprise (a) identification of one or more items related to the web search and indicated as recommended by the generated identifier, and (b) one or more opinions pertaining to one or more items related to the web search and indicated as authored by the generated identifier.

20. A method comprising:

determining multiple preferences associated with a given individual based on web information pertaining to commerce-related activity associated with the given individual;

generating an identifier that identifies the given individual, wherein the identifier is based on the multiple user preferences, and wherein said identifier differs from and is used in lieu of identification information attributable to the given individual on a social network during one or more web searching activities;

quantifying a measure of similarity between the multiple user preferences associated with the identifier and the multiple user preferences associated with one or more additional identifiers on the web, wherein the measure of similarity comprises a weighted score combining the multiple user preferences, wherein each of the multiple user preferences are assigned a distinct weight based on (i) a number of positive sentiments expressed by the individual in connection with each of the multiple user metrics and (ii) a number of negative sentiments expressed by the individual in connection with each of the multiple user metrics; and applying the similarity measure associated with the identifier for the given user to a web-based search associated with the given user to prioritize a search result derived from an identifier with a higher similarity measure as compared to a search result derived from an identifier with a lower similarity measure;

wherein the steps are carried out by at least one computing device.

21. The method of claim 20, wherein said determining comprises determining one or more user preferences associated with a given level of trust so as to preserve a level of privacy in connection with the identity of the given individual.

22. The method of claim 20, wherein said commerce-related activity associated with the given individual comprises one or more web-based comments pertaining to a commercial product and/or service attributable to the given individual.

23. The method of claim 20, comprising:

ranking a set of results for the web-based search according to relative similarity measure.

24. The method of claim 20, comprising:

generating a recommendation of an item of content based on the similarity measure.

* * * * *

UNITED STATES PATENT AND TRADEMARK OFFICE
CERTIFICATE OF CORRECTION

PATENT NO. : 9,799,079 B2
APPLICATION NO. : 14/040937
DATED : October 24, 2017
INVENTOR(S) : Madhu Chetuparambil, Kalapriya Kannan and George T. Jacob Sushil It is certified that error appears in the above-identified patent and that said Letters Patent is hereby corrected as shown below:

On the Title Page

Item (72) Inventors, change "George T. Jacob" to -- George T. Jacob Sushil --.

Signed and Sealed this
Sixth Day of October, 2020

Andrei Iancu
*Director of the United States Patent and Trademark Office*